(12) United States Patent
Kohlman

(10) Patent No.: US 7,455,355 B1
(45) Date of Patent: Nov. 25, 2008

(54) USER ADJUSTABLE MOTORCYCLE SEAT CUSHION WITH INDEPENDENTLY INFLATABLE AND DEFLATABLE ISCHIAL SUPPORT CELL AND GLUTEOUS SUPPORT CELL

(75) Inventor: Steve Kohlman, Onalaska, WI (US)

(73) Assignee: Aquilla Corporation of Wisconsin, Holmen, WI (US)

( * ) Notice: Subject to any disclaimer, the term of this patent is extended or adjusted under 35 U.S.C. 154(b) by 0 days.

(21) Appl. No.: 11/624,792

(22) Filed: Jan. 19, 2007

(51) Int. Cl.
*B62J 1/26* (2006.01)
(52) U.S. Cl. .................................................. 297/200
(58) Field of Classification Search ................ 5/655.3; 297/200, 199, 452.41, DIG. 3
See application file for complete search history.

(56) References Cited

U.S. PATENT DOCUMENTS

| | | | |
|---|---|---|---|
| 2,938,570 A * | 5/1960 | Flajole | 297/339 |
| 2,998,817 A | 9/1961 | Armstrong | |
| 3,148,391 A | 9/1964 | Whitney | |
| 4,175,297 A | 11/1979 | Robbins et al. | |
| 4,190,286 A * | 2/1980 | Bentley | 297/284.3 |
| 4,617,690 A | 10/1986 | Grebe | |
| 4,912,788 A | 4/1990 | Lonardo | |
| 5,052,068 A | 10/1991 | Graebe | |
| 5,103,518 A | 4/1992 | Gilroy et al. | |
| 5,109,560 A | 5/1992 | Uetake | |
| 5,121,513 A | 6/1992 | Thomas et al. | |
| 5,163,196 A | 11/1992 | Graebe et al. | |
| 5,390,384 A | 2/1995 | Dinsmoor, III et al. | |
| 5,419,612 A * | 5/1995 | Rassekhi | 297/200 |
| 5,427,331 A | 6/1995 | Stroud | |
| 5,473,313 A | 12/1995 | Graebe, Jr. | |
| 5,487,197 A | 1/1996 | Iskra, Jr. et al. | |
| 5,500,965 A | 3/1996 | Hannagan et al. | |
| 5,502,855 A | 4/1996 | Graebe | |
| 5,613,257 A | 3/1997 | Graebe | |
| 5,678,265 A | 10/1997 | Meyer | |
| 5,687,438 A | 11/1997 | Biggie et al. | |
| 5,701,622 A | 12/1997 | Biggie et al. | |
| 5,839,140 A | 11/1998 | Wilkerson | |
| 5,845,352 A | 12/1998 | Matsler et al. | |
| 5,963,997 A | 10/1999 | Hagopian | |
| 6,014,784 A | 1/2000 | Taylor et al. | |
| 6,036,271 A * | 3/2000 | Wilkinson et al. | 297/452.41 |
| 6,092,249 A | 7/2000 | Kamen et al. | |
| 6,094,762 A | 8/2000 | Viard et al. | |
| 6,115,860 A | 9/2000 | Vrzalik | |
| 6,135,550 A * | 10/2000 | Tucho | 297/199 |
| 6,216,299 B1 | 4/2001 | Kohlman | |
| 6,392,166 B1 | 5/2002 | Fortune et al. | |

(Continued)

OTHER PUBLICATIONS

Herman Miller, "The Art of Pressure Distribution", 2005.

*Primary Examiner*—Milton Nelson, Jr.
(74) *Attorney, Agent, or Firm*—Sherrill Law Offices, PLLC

(57) ABSTRACT

The invention is an inflatable seat cushion. The cushion includes inflatable cells, a pump, a flow control valve and tubing. The cells include at least one inflatable and deflatable first cell configured and arranged to support the ischial tuberosity bones of a human seated on the cushion, and at least one inflatable and deflatable second cell configured and arranged to support at least a portion of the gluteus maximus muscles of a human seated on the cushion. The flow control valve and accompanying tubing is operable to mutually exclusively place the pump in fluid communication with the at least one first cell or the at least one second cell.

8 Claims, 6 Drawing Sheets

U.S. PATENT DOCUMENTS

| | | |
|---|---|---|
| 6,591,437 B1 | 7/2003 | Phillips |
| 6,623,080 B2 * | 9/2003 | Clapper ................ 297/452.41 |
| 6,668,405 B1 | 12/2003 | Kohlman |
| 6,848,135 B1 | 2/2005 | Kohlman |
| 2003/0159219 A1 | 8/2003 | Harrison et al. |
| 2004/0211004 A1 | 10/2004 | Thompson |
| 2006/0168734 A1 | 8/2006 | Glass |

* cited by examiner

USER ADJUSTABLE MOTORCYCLE SEAT CUSHION WITH INDEPENDENTLY INFLATABLE AND DEFLATABLE ISCHIAL SUPPORT CELL AND GLUTEOUS SUPPORT CELL

BACKGROUND

When seated for extended periods of time, such as occurs when riding or driving long distances, or operating heavy equipment such as a bulldozer or tractor, the posterior area is subjected to prolonged compression which often results in general discomfort, numbness and even pain. The discomfort and pain is often exacerbated by the constant vibration and repetitive bouncing which often accompanies long distance travel and operation of heavy equipment.

It is a common practice for persons suffering such effects to stop traveling or working and get out of the vehicle or equipment in order to stand, stretch and/or walk. While effective for relieving the discomfort, numbness and/or pain, such relief is only temporary and repetitive stops are undesired and unpractical.

U.S. Pat. Nos. 4,175,297, 5,103,518, 5,109,560, 5,500,965, 5,839,140, 5, 963,997, 6,014,784, 6,216,299 and 6,668,405 disclose wheelchair cushion systems wherein the cushion includes an array of inflatable cells including first and second interconnected groupings of cells interspersed throughout the array which are alternately inflated and deflated on a predetermined schedule in order to vary the location of contact between the cushion and the posterior of a person seated on the cushion. Inflation and deflation of the cell groups are linked so that inflation of one group of cells automatically causes deflation of the other group of cells.

While effective for reducing the development of discomfort, numbness and pain when seated for extended periods, such cushions are expensive, noisy and not well suited for use in environments with limited room, such as the driver's side area of an automobile or a motorcycle. Hence, a continuing need exists for a low-cost, quiet, compact inflatable cushion capable of reducing or eliminating the discomfort, numbness and pain which can accompany prolonged seating.

SUMMARY OF THE INVENTION

The invention is an inflatable seat cushion. The cushion includes inflatable cells, a pump, a flow control valve and tubing. The cells include at least one inflatable and deflatable first cell configured and arranged to support the ischial tuberosity bones of a human seated on the cushion, and at least one inflatable and deflatable second cell configured and arranged to support at least a portion of the gluteus maximus muscles of a human seated on the cushion without supporting the ischial tuberosity of the seated human. The flow control valve and accompanying tubing is operable to mutually exclusively place the pump in fluid communication with the at least one first cell or the at least one second cell.

DETAILED DESCRIPTION OF THE INVENTION INCLUDING A BEST MODE

Nomenclature

| | |
|---|---|
| A | Seat |
| 10 | Seat Cushion |
| 11 | Top of Seating Cushion |
| 12 | Bottom of Seating Cushion |
| 13 | First Side of Seating Cushion |
| 14 | Second Side of Seating Cushion |
| 15 | Front End of Seating Cushion |
| 16 | Back End of Seating Cushion |
| 20 | Base |
| 30 | Cells |
| 31 | First Cell |
| 32 | Second Cells |
| 32r | Right Side Second Cell |
| 32s | Left Side Second Cell |
| 40 | Air Pump |
| 50 | Release Valve |
| 60 | Flow Control Valve |
| 61 | First Flow Control Valve |
| 62 | Second Flow Control Valve |
| 68 | Outlet Port in First Flow Control Valve |
| 69 | Outlet Port in Second Flow Control Valve |
| 70 | Tubing |
| 71 | First Length of Tubing Connecting the Flow Control Valve to the First Cell |
| 72 | Second Length of Tubing Connecting the Flow Control Valve to the Second Cells |
| 73 | Third Length of Tubing Connecting the Pump to the Flow Control Valve |
| 80 | Control Box |
| 81 | First Three-Way Switch |
| 82 | Second Three-Way Switch |
| 90 | Battery |
| 160 | Selection Knob |
| 161 | First Mode Position Indicator |
| 162 | Second Mode Position Indicator |
| 163 | Third Mode Position Indicator |
| 164 | Fourth Mode (Closed) Position Indicator |
| x | Central Longitudinal Axis |

Construction

Seating Cushion

The invention is a user adjustable inflatable seat cushion 10 particularly adapted for use on a motorcycle seat A. The cushion 10 includes at least one inflatable and deflatable first cell 31 configured and arranged to support the ischial tuberosity bones (not shown) of a rider (not shown) seated on the cushion 10, and at least one inflatable and deflatable second cell 32 configured and arranged to support at least a portion of the gluteus maximus muscles (not shown) of a rider (not shown) seated on the cushion 10 without supporting the ischial tuberosity bones (not shown) of the rider (not shown). The cells 30 are positioned and grouped to permit selective segregation of the ischial tuberosity bones (not shown) of a rider (not shown) from other areas of the buttock (not shown) for supporting a rider (not shown) upon a seat A, thereby allowing a rider (not shown) to periodically increase or decrease the amount of pressure exerted upon his/her ischial tuberosity bones (not shown) for alleviating sitting pain created when pressure is exerted upon the tissue surrounding the ischial tuberosity bones (not shown) for extended periods.

Figure 1:
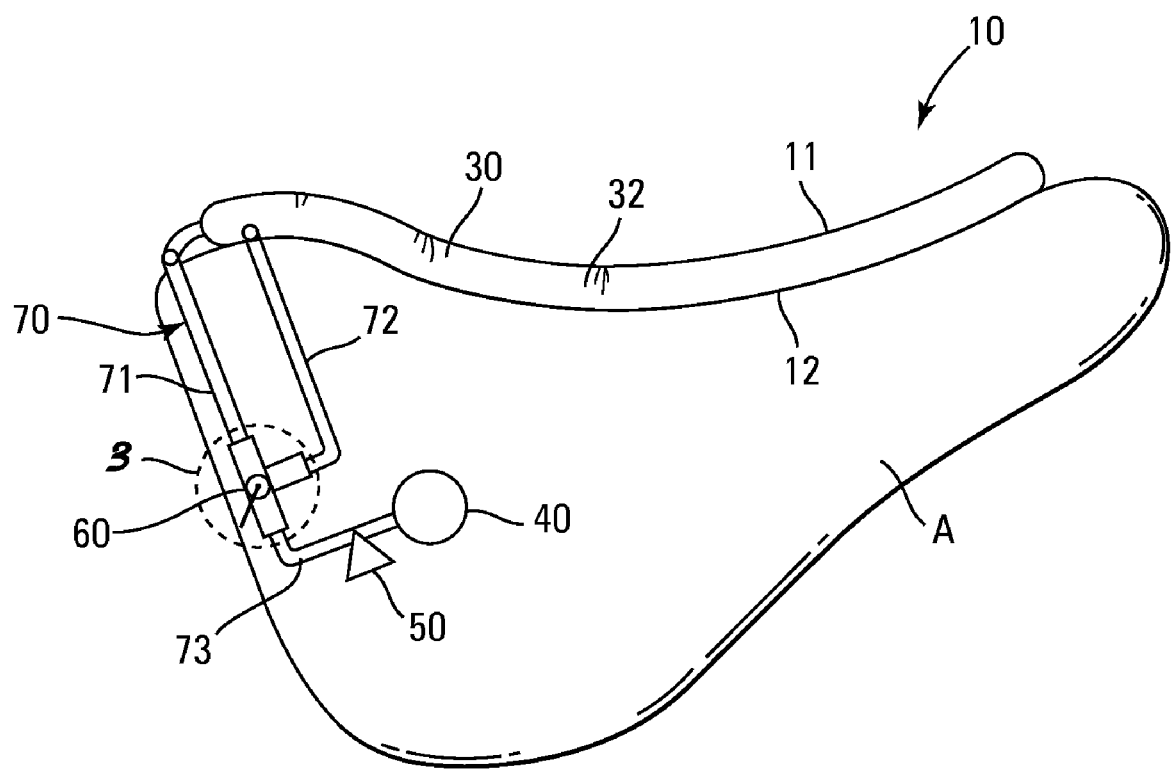
FIG. 1 is a side view of one embodiment of the invention equipped with a manually operable pump, relief valve and flow control valve fitted onto a motorcycle seat.
Figure 2:
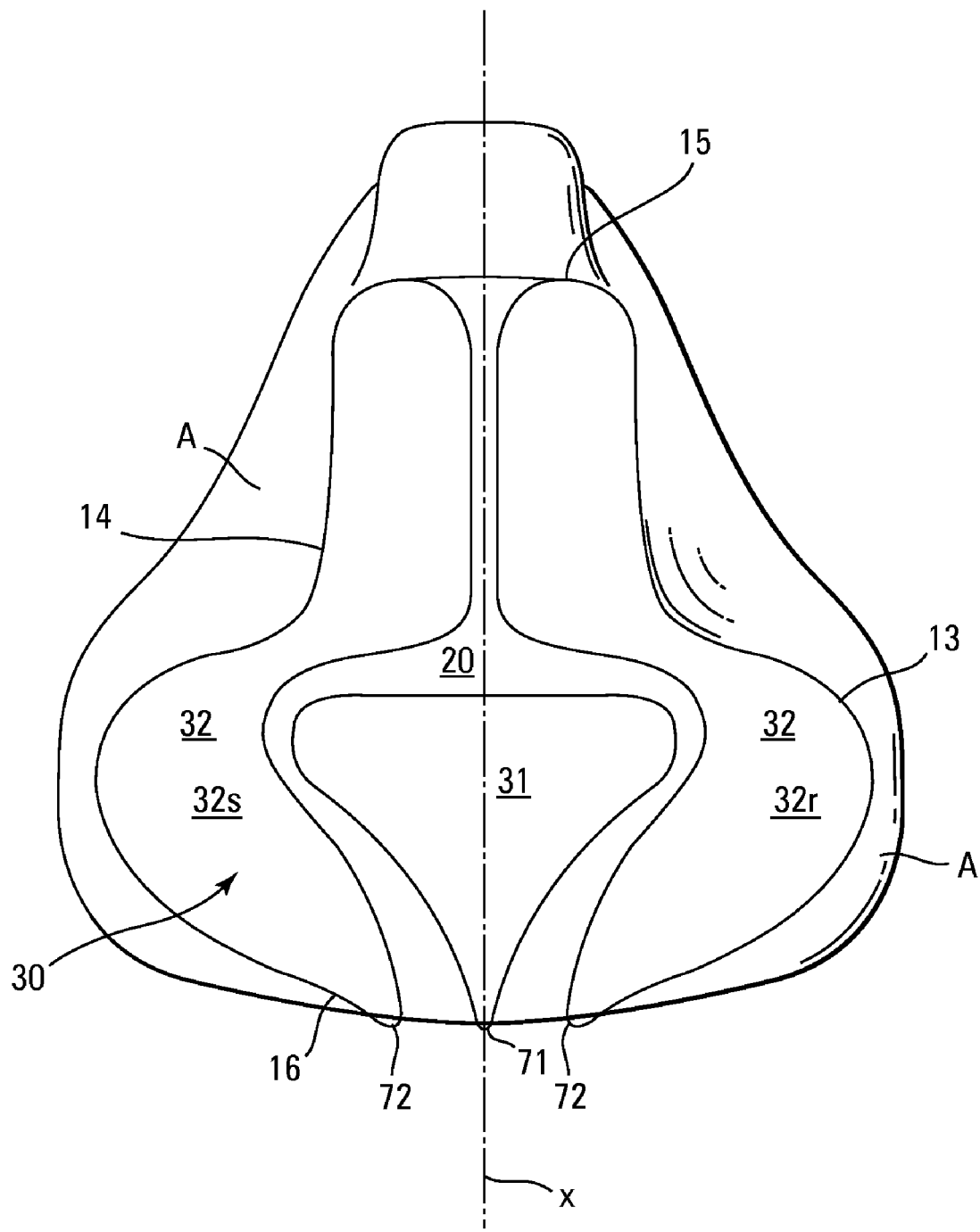
FIG. 2 is a top view of the invention shown in FIG. 1.
Figure 4:
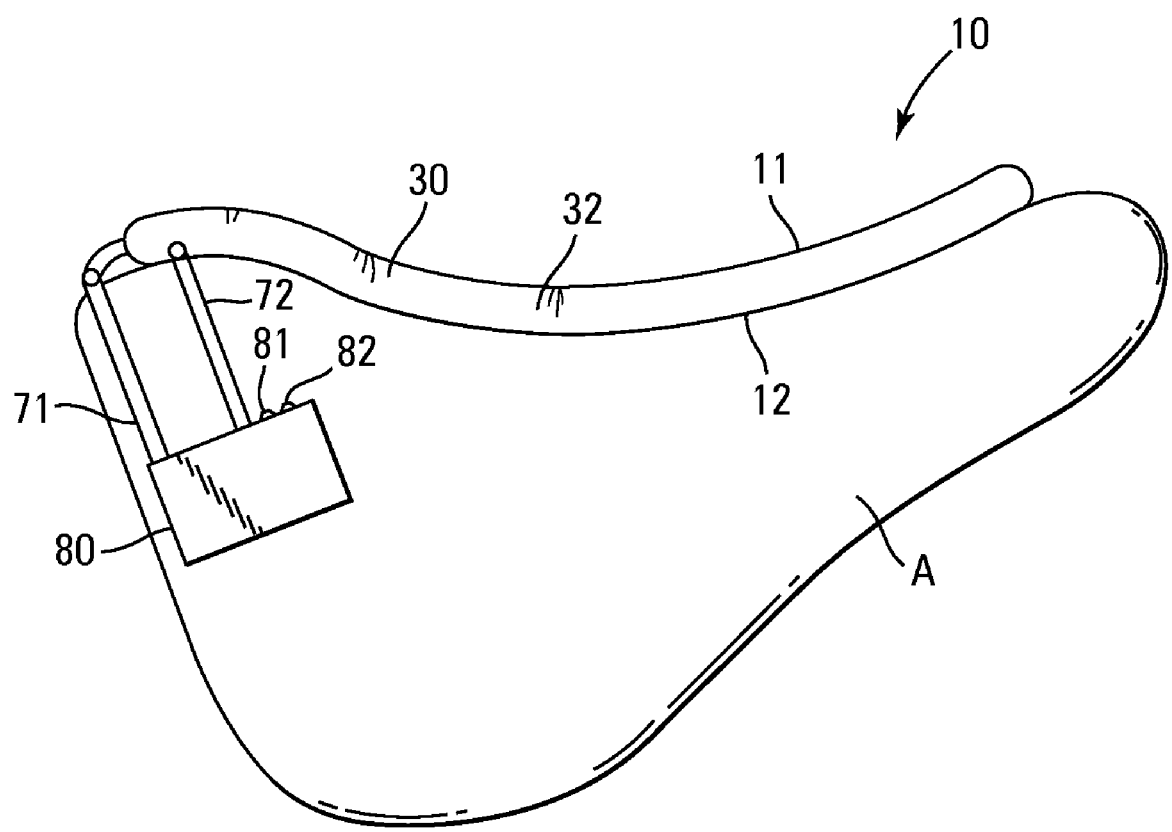
FIG. 4 is a side view of another embodiment of the invention equipped with an electrically powered pump, relief valve and flow control valve fitted onto a motorcycle seat.
Figure 6:
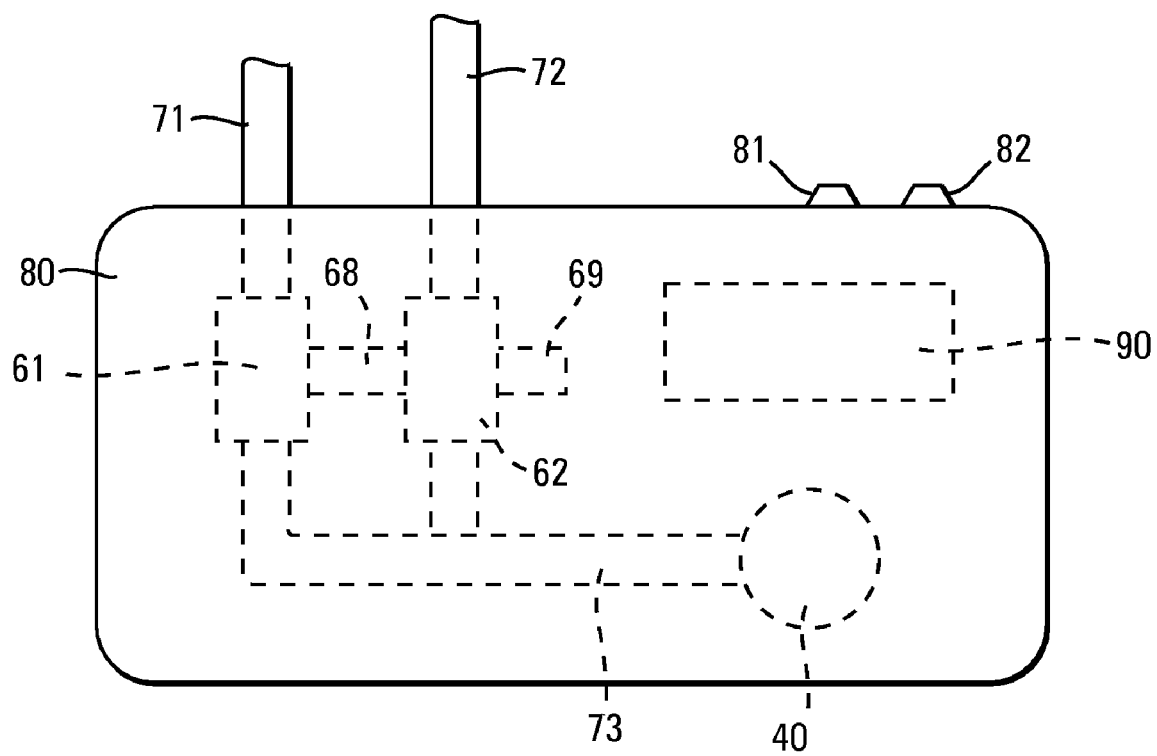
FIG. 6 is an enlarged view of the control box shown in FIG. 4.

Referring to FIGS. 1 and 2, the seating cushion 10 includes a base 20, a plurality of cells 30, a pump 40, a release valve 50, at least one flow control valve 60 and associated interconnecting tubing 70. The pump 40, release valve 50 and flow control valve(s) 60 may be retained within a control box 80 as shown in FIGS. 4 and 6. The seating cushion 10 can be used in connection with any type of seating including standard residential and office chairs, airplane seats, vehicle seating, etc., but is particularly well adapted for use on a motorcycle seat A.

Referring to FIGS. 1, 2, 4 and 6, the base 20 and cells 30 define a top surface 11, a bottom surface 12, a first or right side 13, a second or left side 14, a front 15 and a back 16.

The base 20 is preferably a planar sheet of material having sufficient flexibility and structural integrity, such as rubber, neoprene, urethane, vinyl, or plastisol.

The cells 30 must be constructed from a material having sufficient structural integrity to support an individual in a seated or prone position upon the inflated cells 30. In addition, the cells 30 must be capable of withstanding repeated inflation and deflation cycles. The cells 30 are preferably constructed of a resilient material such as, but not limited to rubber, neoprene, urethane, vinyl, or plastisol.

The cells 30 are connected to the base 20 by any conventional means, including specifically, but not exclusively heat sealing, adhesive bonding or RF welding.

Figure 5:
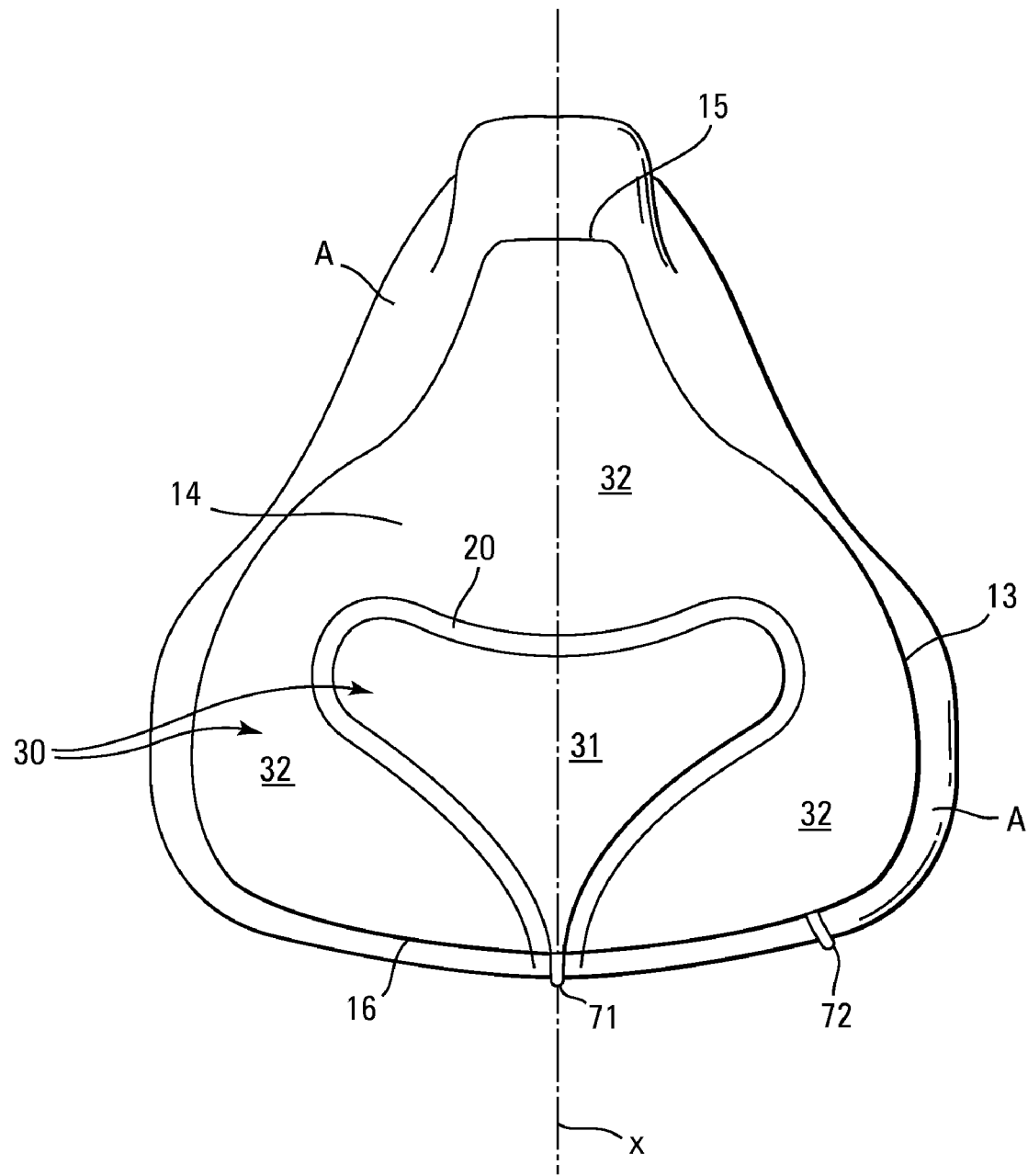
FIG. 5 is a top view of the invention shown in FIG. 4.

Referring to FIGS. 2 and 5, the cushion 10 includes at least one inflatable and deflatable first cell 31 configured and arranged to support the ischial tuberosity bones (not shown) and optionally expanded to support the coccyx bone (not shown) of a human (not shown) seated on the cushion 10, and at least one inflatable and deflatable second cell 32 configured and arranged with a right side portion 32*r* and a left side portion 32*s* to support at least a portion of the gluteus maximus muscles (not shown) of a human (not shown) seated on the cushion 10 without supporting the ischial tuberosity bones (not shown) of the seated human (not shown).

The first cell 31 and the second cell 32 may each be a single cell 30 or a plurality of cells 30 having the same or different shapes. The cells 30 may have a regular or irregular shape, and may be arranged as an orderly array, such as disclosed in U.S. Pat. No. 6,216,299 or arranged in a random pattern such as disclosed in U.S. Pat. No. 6,668,405.

The positioning or grouping of the cells 30 into a first cell(s) 31 configured and arranged to support the ischial tuberosity bones (not shown) and optionally the coccyx bone (not shown), and a second cell(s) 32 configured and arranged to support at least a portion of the gluteus maximus muscles (not shown) without supporting the ischial tuberosity bones (not shown). Pressure relief underneath the ischial tuberosities (not shown) and the optionally the coccyx (not shown) can be achieved by providing a higher inflation pressure in the second cell(s) 32 and a lower inflation pressure in the first cell(s) 31. Conversely, pressure relief of the gluteus maximus muscles (not shown) can be achieved by providing a higher inflation pressure in the first cell(s) 31 and a lower inflation pressure in the second cell(s) 32.

The cells 30 are preferably symmetrically configured and arranged on opposite sides of a central longitudinal axis x.

The base 20 and cells 30 are preferably surrounded with a protective and/or decorative removable cover (not shown).

Referring to FIG. 1, a first embodiment of the cushion 10 is equipped with a hand-operated manual air pump 40 and a release valve 50 in fluid communication with the cells 30 for inflating and deflating the cells 30. A manually operated three-way flow control valve 60 is positioned between the pump 40 and release valve 50, and the cells 30. The flow control valve 60 is operable in a first mode for placing the pump 40 and relief valve 50 in fluid communication with the first cell(s) 31 by positioning selection knob 160 in a first position pointing to a first dial marking 161, operable in a second mode for placing the pump 40 in fluid communication with the second cell(s) 32 by positioning selection knob 160 in a second position pointing to a second dial marking 162, and operable in a third mode for closing the flow control valve 60 by positioning selection knob 160 in a third position pointing to a third dial marking 163. The flow control valve 60 preferably also permits selection of a fourth mode for placing the first cell(s) 31 and the second cell(s) 32 into fluid communication with one another so as to permit the pressure within all the cells 30 to equalize, by positioning selection knob 160 in a fourth position pointing to a fourth dial marking 164.

Referring to FIGS. 4 and 6, a second embodiment replaces the manual pump 40 and relief valve 50 with a control box 80. An exemplary control box 80, shown in FIG. 6, includes (i) an air pump 40, (ii) a battery 90, (iii) a first three-position power switch 81 electrically connected to the battery 90, pump 40, and a first flow control valve 61 wherein the first flow control valve 61 fluidly interacts with the first cell(s) 31, and (vi) a second three-position power switch 82 electrically connected to the battery 90, pump 40, and a second flow control valve 62 wherein the second flow control valve 62 fluidly interacts with the second cell(s) 32.

A recharging socket (not shown) can optionally be provided for electrically connecting the battery (not shown) to a recharging unit (not shown) so as to allow recharging of the battery (not shown). Alternatively, when intended for use in a vehicle (not shown), heavy equipment (not shown) or other equipment having a battery (not shown), an electrical cord (not shown) with a suitable socket (not shown) and adapter (not shown) can be provided for electrically connecting the control box 80 with the vehicle battery (not shown).

A check valve (not shown) is preferably positioned along the first length of tubing 71 between the pump 40 and the relief valve 50 for preventing airflow from reversing and entering the pump 40 when operation of the pump 40 is terminated.

The control box 80 allows the user (not shown) to independently control the amount of fluid pressure within the first and second cell(s) 31 and 32 respectively The first and second three-position power switches 81 and 82 respectively, each have an OFF, INFLATE and DEFLATE position. When either of the three-position power switches 81 or 82 is switched to OFF the electrical circuit from the battery 90 to the pump 40 is opened to prevent operation of the pump 40, and both flow control valves 61 and 62 are closed. When either of the three-position power switches 81 or 82 is switched to INFLATE, the electrical circuit from the battery 90 to the pump 40 is closed to initiate operation of the pump 40, and the associated flow control valve 61 or 62 is opened to allow air-flow from the pump 40 into the associated cell(s) 31 or 32 respectively. When either of the three-position power switches 81 or 82 is switched to DEFLATE, the electrical circuit from the battery 90 to the pump 40 is opened to prevent operation of the pump 40, and the associated flow control valve 61 or 62 is opened to allow air-flow from the associated cell(s) 31 or 32 through the outlet port 68 or 69 in the associated flow control valve 61 or 62.

Figure 3:
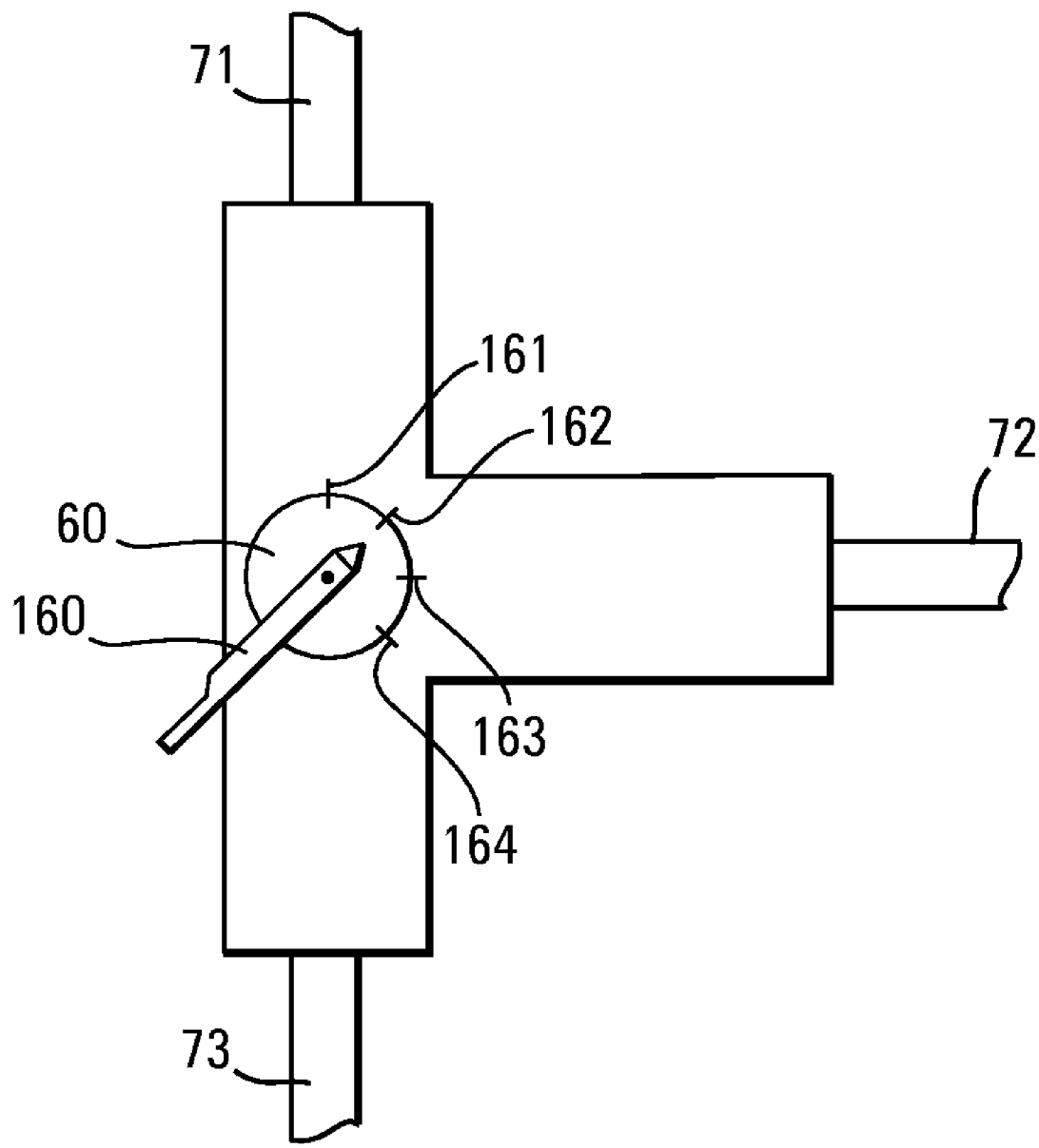
FIG. 3 is an enlarged view of that portion of the invention shown in FIG. 1 within circle 3.

Referring to FIGS. 1 and 3, the first embodiment of the cushion 10 includes a first length of tubing 71 fluidly connecting a first outlet orifice on the flow control valve 60 to the first cell(s) 31, a second length of tubing 72 fluidly connecting a second outlet orifice on the flow control valve 60 to the second cell(s) 32, and a third length of tubing 73 fluidly connecting the pump 40 and the relief valve 50 to the inlet orifice on the flow control valve 60.

Referring to FIGS. 4 and 6, the second embodiment of the cushion 10 includes a first length of tubing 71 fluidly connecting the first flow control valve 61 to the first cell(s) 31, a second length of tubing 72 fluidly connecting the second flow control valve 62 to the second cell(s) 32, and a third length of tubing 73 fluidly connecting the pump 40 to the flow control valves 61 and 62.

Still referring to FIGS. 4 and 6, the first length of tubing 61 fluidly connects the first flow control valve 61 to the first cell(s) 31 for delivering pressurized fluid to the first cell(s) 31 when the first three-way power switch 81 is positioned to INFLATE and for venting pressurized fluid from the first cell(s) 31 through the outlet port 68 when the first three-way power switch 81 is positioned to DEFLATE. In similar fashion, the second length of tubing 62 fluidly connects the second flow control valve 62 to the second cell(s) 32 for delivering pressurized fluid to the second cell(s) 32 when the second three-way power switch 82 is positioned to INFLATE and for venting pressurized fluid from the second cell(s) 32 through the outlet port 69 when the second three-way power switch 82 is positioned to DEFLATE.

Alternatively, the control box 80 could include (i) a two-position FIRST/SECOND switch (not shown) for selecting which of the first and second flow control valves 61 and 62 can be energized and thereby selecting the cell(s) 31 or 32 to be inflated or deflated, (ii) a two-position INFLATE/DEFLATE switch (not shown) for controlling the position of the energized flow control valve 61 or 62 as between inflation and deflation modes and preventing operation of the pump 40 when in the deflation mode, and (iii) a two-position ON/OFF power switch (not shown) for controlling operation of the pump 40. Other switch combinations are also possible and known to those having ordinary skill in the art.

Periodic adjustments in the load bearing responsibility as between the first cell(s) 31 and the second cell(s) 32 is effective for shifting and adjusting the load bearing responsibility as between the ischial tuberosity bones and the gluteus maximus muscles, and thereby reduces or eliminates the discomfort, numbness and pain which can accompany prolonged seating.

Use

The cushion 10 may be employed as a portable overlay with or without an elastic fitted skirt (not shown), or may be incorporated directly into the seat A.

The user (not shown), preferably while seated on the cushion 10, inflates or deflates the first cell(s) 31 and second cell(s) 32 to the desired relative pressure. At any time thereafter and on a schedule determined by the user, the user may adjust the pressure in one or both of the cells 30 in order to adjust or shift the load bearing responsibility as between the ischial tuberosity bones and the gluteus maximus muscles.

When a hand-operated manual pump 40 is employed, the user simply adjusts the manual flow control valve 60 to place the pump 40 into fluid communication with the desired cell(s) 31 or 32, and then either squeezes the pump 40 to inflate or opens relief valve 50 to deflate the selected cell(s) 31 or 32.

When control box 80 with the two, three-position power switches 81 and 82 is employed, the user simply selects the three-position power switch 81 or 82 corresponding to the cell(s) 31 or 32 which the user desires to inflate or deflate, and then either moves the selected switch 81 or 82 from OFF to INFLATE in order to inflate the corresponding cell(s) 31 or 32 or moves the selected switch 81 or 82 from OFF to DEFLATE in order to deflate the corresponding cell(s) 31 or 32. The user returns the power switch 81 or 82 back to the OFF position when the desired pressure in the cells 31 or 32 is achieved.

When control box 80 with the three, two-position power switches (not shown) is employed, the user simply (i) positions the FIRST/SECOND switch (not shown) to correspond with the cell(s) 31 or 32 to be inflated or deflated, (ii) positions the INFLATE/DEFLATE switch (not shown) to the desired inflation/deflation mode, and then (iii) moves the ON/OFF power switch (not shown) to ON until the desired pressure level is achieved in the selected cell(s) 31 or 32. The user returns the ON/OFF switch to OFF once the desire pressure level is achieved.

I claim:

1. An inflatable seat cushion comprising;
   (a) at least one inflatable and deflatable first cell configured and arranged to support ischial tuberosity bones and a coccyx bone of a human when seated on the cushion,
   (b) at least one inflatable and deflatable second cell configured and arranged to support at least a portion of left and right gluteus maximus muscles of a human when seated on the cushion without supporting the ischial tuberosity of the seated human,
   (c) a pump, and at least one flow control valve with accompanying tubing operable to mutually exclusively place the pump in fluid communication with the at least one first cell or the at least one second cell, wherein the at least one flow control valve is (i) opearable in a first mode for placing the pump in fluid communication with the at least one first cell whereby operation of the pump is effective for inflating the at least one first cell, (ii) operable in a second mode for placing the pump in fluid communication with the at least one second cell whereby operation of the pump is effective for inflating the at least one second cell, and (iii) operable in a third mode for placing the at least one first cell in fluid communication with the at least one second cell whereby pressure within the at least one first cell and the at least one second cell will equalize.

2. The inflatable seat cushion of claim 1 wherein the pump is a manually operated pump.

3. The inflatable seat cushion of claim 1 wherein the pump is an electrically operated pump.

4. The inflatable seat cushion of claim 1 wherein the at least one flow control valve is a manually operated flow control valve.

5. The inflatable seat cushion of claim 1 wherein the at least one flow control valve is an electrically operated valve.

6. The inflatable seat cushion of claim 1 wherein the at least one second cell is configured and arranged to also support at least a portion of a hamstring muscles of a human when seated on the cushion.

7. The inflatable seat cushion of claim 1 further comprising at least one relief valve with accompanying tubing operable to mutually exclusively place the relief valve in fluid communication with the at least one first cell for permitting selective deflation of the at least one first cell, or the at least one second cell for permitting selective deflation of the at least one second cell.

8. The inflatable seat cushion of claim 7 wherein the pump and the at least one relief valve fluidly communicate with the at least one flow control valve through a same length of tubing.

* * * * *